(12) United States Patent
MacAdams et al.

(10) Patent No.: US 10,773,508 B2
(45) Date of Patent: Sep. 15, 2020

(54) BONDING OF COMPOSITE MATERIALS (71) Applicant: CYTEC INDUSTRIES INC., Woodland Park, NJ (US)

(72) Inventors: Leonard MacAdams, Woolwich Township, NJ (US); Dalip Kohli, Churchville, MD (US)

(73) Assignee: CYTEC INDUSTRIES INC., Woodland Park, NJ (US)

( * ) Notice: Subject to any disclaimer, the term of this patent is extended or adjusted under 35 U.S.C. 154(b) by 272 days.

(21) Appl. No.: 15/462,817

(22) Filed: Mar. 18, 2017

(65) Prior Publication Data

US 2017/0190165 A1 Jul. 6, 2017

Related U.S. Application Data (62) Division of application No. 14/339,905, filed on Jul. 24, 2014, now Pat. No. 9,636,867.

(Continued)

(51) Int. Cl.
*B32B 37/12* (2006.01)
*C08J 5/24* (2006.01)
(Continued)

(52) U.S. Cl.
CPC .......... *B32B 37/1207* (2013.01); *B29C 65/02* (2013.01); *B29C 65/4835* (2013.01);
(Continued)

(58) Field of Classification Search
CPC ..... B29C 66/71; B29C 66/0224; B29C 66/45; B29C 66/721; B29C 66/72141; B29C 66/72143; B29C 66/73751; B29C 66/7394; B29C 66/73941; B29C 65/02; B29C 65/4835; B29C 65/5057; B29C 65/483; B29C 65/0224; B29K 2063/00; B29K 2267/00; B29K 2307/04; B29K 2309/08; B29K 2071/00; B29K 3031/3076; B29K 3031/30; C08J 2363/00; C08J 2363/04;
(Continued)

(56) References Cited

U.S. PATENT DOCUMENTS 4,004,061 A * 1/1977 Creighton .................. C09J 7/10
428/349
6,645,610 B1 11/2003 Reis et al.
(Continued)

FOREIGN PATENT DOCUMENTS

EP 1499169 A1 1/2005
EP 2103416 A2 9/2009
(Continued)

*Primary Examiner* — Camie S Thompson
(74) *Attorney, Agent, or Firm* — Thi Dang (57) ABSTRACT

Peel ply for surface preparation and a method of surface preparation prior to adhesive bonding. A resin-rich peel ply is applied onto a curable, resin-based composite substrate, followed by co-curing. After co-curing, the composite substrate is fully cured but the matrix resin in the peel ply remains partially cured. When the peel ply is removed, a roughened, bondable surface with chemically-active functional groups is revealed. The composite substrate with the chemically-active, bondable surface may be bonded to another composite substrate to form a covalently-bonded structure.

4 Claims, 8 Drawing Sheets

Related U.S. Application Data (60) Provisional application No. 61/868,640, filed on Aug. 22, 2013.

(51) Int. Cl.

| | | |
|---|---|---|
| *C09J 5/02* | (2006.01) | |
| *B29C 65/00* | (2006.01) | |
| *B29C 65/48* | (2006.01) | |
| *B29C 65/50* | (2006.01) | |
| *B29C 65/02* | (2006.01) | |
| *C09J 163/00* | (2006.01) | |
| *B32B 5/02* | (2006.01) | |
| *B32B 5/12* | (2006.01) | |
| *B32B 7/06* | (2019.01) | |
| *B32B 7/12* | (2006.01) | |
| *B32B 27/38* | (2006.01) | |
| *B32B 37/00* | (2006.01) | |
| *B32B 38/10* | (2006.01) | |
| *B32B 27/20* | (2006.01) | |
| *C09J 163/04* | (2006.01) | |
| *B29C 70/54* | (2006.01) | |
| *B32B 38/00* | (2006.01) | |
| *B29L 31/30* | (2006.01) | |

(52) U.S. Cl.
CPC ...... *B29C 65/5057* (2013.01); *B29C 66/0224* (2013.01); *B29C 66/1122* (2013.01); *B29C 66/30322* (2013.01); *B29C 66/45* (2013.01); *B29C 66/721* (2013.01); *B29C 66/7394* (2013.01); *B29C 66/73161* (2013.01); *B29C 66/73751* (2013.01); *B32B 5/02* (2013.01); *B32B 5/12* (2013.01); *B32B 7/06* (2013.01); *B32B 7/12* (2013.01); *B32B 27/20* (2013.01); *B32B 27/38* (2013.01); *B32B 37/0038* (2013.01); *B32B 37/025* (2013.01); *B32B 37/12* (2013.01); *B32B 38/10* (2013.01); *C08J 5/24* (2013.01); *C09J 5/02* (2013.01); *C09J 163/00* (2013.01); *C09J 163/04* (2013.01); *B29C 66/71* (2013.01); *B29C 66/7212* (2013.01); *B29C 66/72141* (2013.01); *B29C 66/72143* (2013.01); *B29C 66/73941* (2013.01); *B29C 70/54* (2013.01); *B29L 2031/30* (2013.01); *B32B 2037/1253* (2013.01); *B32B 2038/0076* (2013.01); *B32B 2260/046* (2013.01); *B32B 2262/02* (2013.01); *B32B 2262/10* (2013.01); *B32B 2305/188* (2013.01); *B32B 2305/74* (2013.01); *B32B 2315/085* (2013.01); *B32B 2363/00* (2013.01); *B32B 2605/18* (2013.01); *C08J 2363/00* (2013.01); *C08J 2363/04* (2013.01); *C08J 2463/02* (2013.01); *C09J 2463/003* (2013.01); *Y10T 428/249921* (2015.04)

(58) Field of Classification Search
CPC ..... C08J 2463/02; C08J 5/24; B29L 2031/30; B32B 2037/1253; B32B 2038/0076; B32B 2260/046; B32B 2305/188; B32B 2305/14; B32B 2363/00; B32B 27/38; B32B 37/12; B32B 38/10; B32B 7/06; B32B 7/12; B32B 2315/085; B32B 3/18; B32B 2305/74; B32B 37/1207; C09J 163/00; C09J 163/04; C09J 7/20; Y10T 428/2826; Y10T 428/249921
USPC ..... 428/40.1; 156/230, 247; 427/202, 407.1, 427/40

See application file for complete search history.

(56) References Cited

U.S. PATENT DOCUMENTS

| | | |
|---|---|---|
| 7,235,145 B2 | 6/2007 | Gfeller et al. |
| 9,193,129 B2 | 11/2015 | Rogalski |
| 2009/0239018 A1 | 9/2009 | Aijima |
| 2012/0125517 A1 | 5/2012 | Galera Cordoba et al. |
| 2013/0129957 A1 | 5/2013 | Zhao et al. |
| 2014/0141234 A1* | 5/2014 | Rogalski .................. B32B 3/18 428/321.5 |

FOREIGN PATENT DOCUMENTS

| | | | |
|---|---|---|---|
| JP | S61-252284 | * | 7/1983 |
| JP | 61252284 A | | 11/1986 |
| RU | 2294351 C2 | | 2/2007 |
| UA | 26358 U | | 9/2007 |

* cited by examiner

BONDING OF COMPOSITE MATERIALS

The current application is a divisional application of U.S. application Ser. No. 14/339,905 filed on Jul. 24, 2014, which claims the benefit of prior U.S. Provisional Application No. 61/868,640 filed on Aug. 22, 2013, both of which are incorporated herein in their entirety.

BACKGROUND

Adhesive bonding has been conventionally used as a method of joining composite structures, such as those used in the aerospace industry. Currently, adhesive bonding of composite structures is carried out predominantly by one of three ways: (1) co-curing, (2) co-bonding, and (3) secondary bonding.

"Co-curing" involves joining uncured composite parts by simultaneously curing and bonding, wherein the composite parts are being cured together with the adhesive, resulting in chemical bonding. However, it is difficult to apply this technique to the bonding of uncured prepregs to fabricate large structural parts with complex shapes. Uncured composite materials, e.g. prepregs, are tacky (i.e. sticky to the touch) and lack the rigidity necessary to be self-supporting. As such, uncured composite materials are difficult to handle. For example, it is difficult to assemble and bond uncured composite materials on tools with complex three-dimensional shapes.

"Co-bonding" involves joining a pre-cured composite part to an uncured composite part by adhesive bonding, wherein the adhesive and the uncured composite part are being cured during bonding. The pre-cured composite usually requires an additional surface preparation step prior to adhesive bonding.

"Secondary bonding" is the joining together of pre-cured composite parts by adhesive bonding, wherein only the adhesive is being cured. This bonding method typically requires surface preparation of each previously cured composite part at the bonding surfaces.

Proper surface treatment for co-bonding and secondary bonding is a prerequisite to achieve the highest level of bond line integrity in adhesively bonded structures. Bond line integrity, generally, refers to the overall quality and robustness of the bonded interface. Conventional co-bonding and secondary bonding processes typically include a surface treatment of the composite structures pursuant to the manufacturer's specifications prior to adhesive bonding. Surface treatments include, but are not limited to grit blasting, sanding, peel ply, priming, etc. These surface treatment methods improve adhesion predominantly by mechanical roughening of the surface. The roughened surface allows for better adhesion due to mechanical interlocking at the bonding interface. Such co-bonding or secondary bonding of pre-cured composite structures has a limitation in that the bonding mechanism occurs only through mechanical interlocking with no formation of chemical bonds as in co-cure bonding. Such surface treatments, if performed improperly, could become a source of bond failure during the use of the final bonded structure. Furthermore, in the absence of chemical bond formation at the interface of a composite bonded assembly, the assessment of bond line quality is critical to ensure that proper bonding has occurred. Unfortunately, assessment of bond line quality is often difficult and current techniques known in the art to measure bond line quality are not well suited to measure and evaluate all potential sources of weak bonds.

In the aerospace industry, adhesives are typically used in combination with mechanical fasteners (e.g. rivets, screws, and bolts) to safely and reliably secure structural materials. Rarely are structural adhesives used as the sole mechanism for joining structural parts in an aircraft. Adhesively bonded parts exhibit significant advantages over parts joined by mechanical fasteners including: lighter weight, reduced stress concentrations, durability, lower part count, etc. Despite these benefits, the use of adhesive bonding is limited due, in part, to the difficulty in assessing bond line integrity. Currently, no non-destructive method exists to measure the bond strength of joined parts. The only way to measure the strength of an adhesively bonded joint is to find the ultimate strength, which is obtained by breaking the bond. For obvious reasons, this type of destructive testing is not practical in an industrial manufacturing environment such as the assembly of an aircraft. Moreover, proof testing a large number of specimens to determine the average load capacity of an adhesive does not guarantee that each and every bonded structure will have the expected bond strength.

In order to meet certain aviation certification requirements in countries such as the United States, structural redundancy of primary structures is currently required. Current state-of-the-art bonding methods are not able to satisfy those requirements. Currently, only co-cured structures are certified by the Federal Aviation Administration (FAA) in the United States for primary structures and are used extensively in the aerospace industry. Thus, there remains a need for an adhesive bonding method or technology that can be used in a manufacturing environment as a method of creating reliable and high-strength chemical bonds while providing excellent reproducibility of bond line quality. Furthermore, there remains a need for a bonding method that could satisfy the structural redundancy requirements (e.g. those set out by the FAA in the United States) without adding extra manufacturing steps.

SUMMARY

The present disclosure provides a resin-rich peel ply composed of a woven fabric impregnated with a resin matrix that is different from the resin matrix of the composite prepreg. The peel ply is designed such that it can be co-cured with a composite substrate (e.g. prepreg or prepreg layup), and upon removal of the peel ply, a thin, continuous film of peel ply resin remains on the cured surface of the fully cured composite substrate but the peel ply resin is partially cured. The partially cured peel ply resin film provides a surface that has chemically reactive functional groups capable of chemically reacting with an adhesive resin in a subsequent bonding step. This peel ply is designed so that it can be applied to various composite substrates, such as prepregs, to modify their surfaces for obtaining improved adhesion and bonding properties. As such, the peel ply disclosed herein offers a step change in bonding technology over current state of the art methodologies.

Also disclosed herein is a novel method of surface preparation prior to adhesive bonding. This surface preparation method involves applying the resin-rich peel ply discussed above onto a curable, resin-based composite substrate, followed by co-curing. After co-curing, the composite substrate is fully cured but the matrix resin in the peel ply remains partially cured. When the peel ply is removed, a roughened, bondable surface with chemically-active functional groups is revealed. Also disclosed is a method for bonding the composite substrate with a chemically-active, bondable surface to another composite substrate to form a covalently-bonded structure.

DETAILED DESCRIPTION

The novel surface preparation method disclosed herein enables the creation of a chemically-active composite surface that is chemically bondable to another substrate via the use of a resin-based adhesive. One advantage of this bonding method is that a chemical bond is created between the composite surface and the adhesive, resulting in a stronger bond between composite substrates. Another advantage of this process is that it minimizes the effect of contamination on the bonding surfaces of the composite substrates. Furthermore, this bonding method can be practiced on an industrial scale and does not require substantial change to the infrastructure currently being used in the industry.

The bonding method disclosed herein allows for a way of achieving a certifiable bonding method by creating chemically reactive functional groups at the surface to be bonded, resulting in a co-cured structure. Consequently, the novel bonding method disclosed herein provides a way of satisfying structural redundancy requirements such as those set out by the FAA in the United States without adding extra manufacturing steps.

Figure 1A:
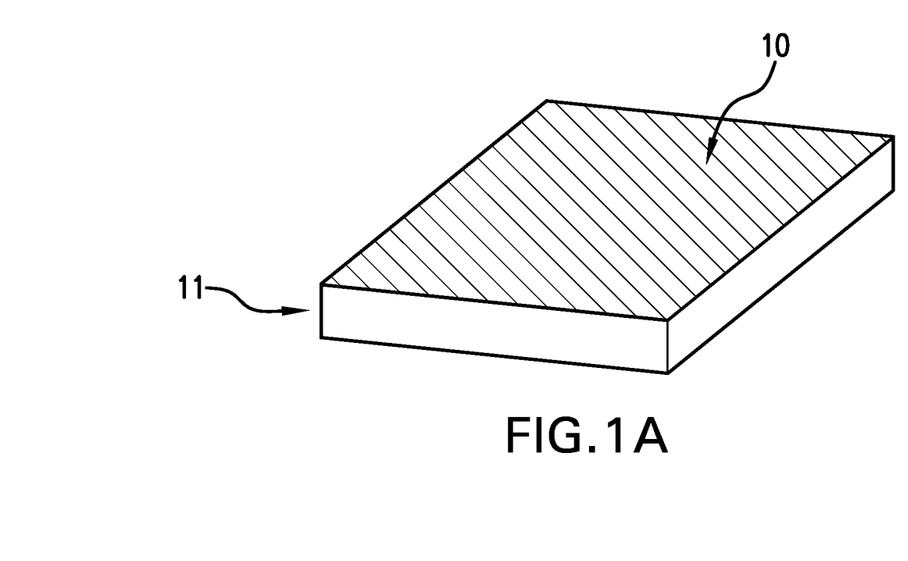
FIGS. 1A-1C illustrates a method of preparing the surface of a composite substrate for adhesive bonding, according to one embodiment of the present disclosure.
Figure 1B:
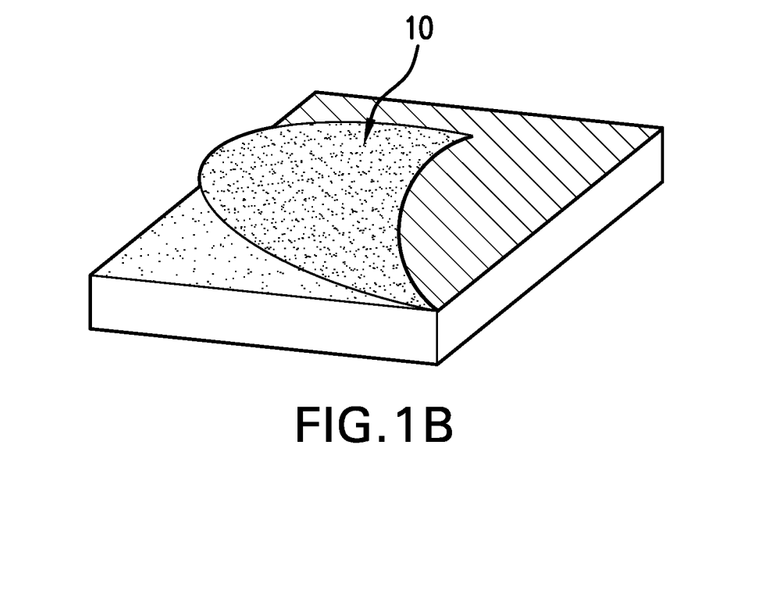
Figures 1C, 1D:
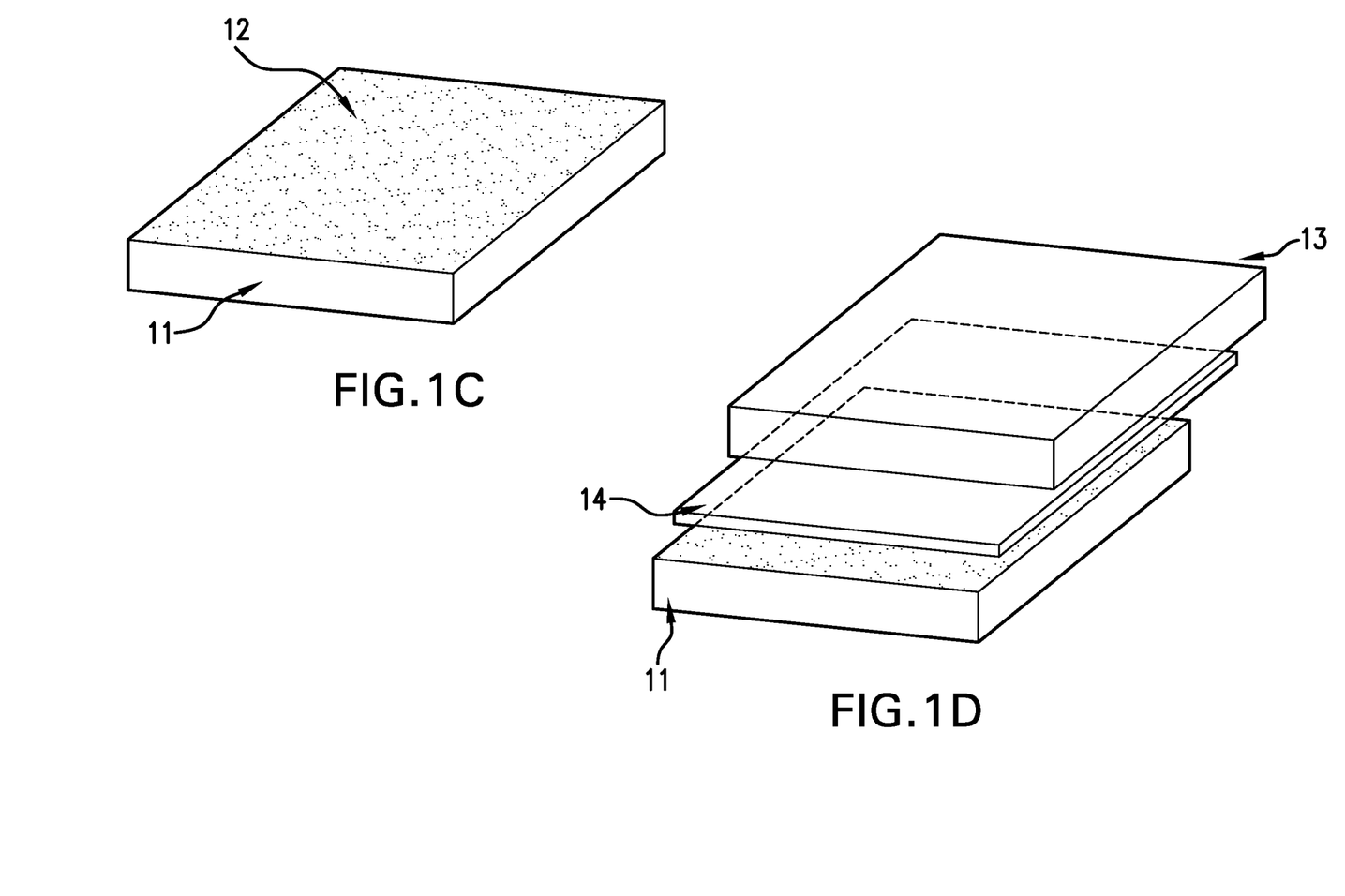
FIGS. 1D-1E illustrates the adhesive bonding of composite substrates after surface preparation.

The aforementioned chemically active composite surface is created by using a resin-rich peel ply. FIGS. 1A-1C illustrates how a resin-rich peel ply is used to create a bondable surface with chemically-active functional groups. Referring to FIG. 1A, a curable peel ply 10 is first laminated onto an outermost surface of an uncured or curable composite substrate 11. The uncured/curable composite substrate is composed of reinforcement fibers infused or impregnated with an uncured or curable matrix resin, which contain one or more thermoset resins. The curable peel ply 10 is composed of a woven fabric infused or impregnated with a curable matrix resin that is different from the uncured/curable matrix resin of the composite substrate. The matrix resin of the peel ply 10 also contains one or more thermoset resins; however, it is formulated so that the peel ply resin is only partially cured when the composite substrate 11 is fully cured under the same curing conditions. Next, co-curing of the peel ply 10 and the composite substrate 11 is carried out by heating at elevated temperature(s) for a pre-determined time period until the composite substrate 11 is fully cured, but the peel ply 10 is only partially cured. As a result of co-curing, the peel ply matrix resin intermingles and reacts with the composite matrix resin. The rheology and cure kinetics of the peel ply resin are controlled to obtain the desired amount of intermingling between the peel ply resin matrix and the s resin matrix of the composite substrate to maximize the co-curing of the resin matrice, s thereby ensuring that a sufficient amount of peel ply resin remains on the surface following co-curing. After co-curing, the peel ply (including the fabric therein) is peeled off (FIG. 1B) to yield a rough, bondable surface 12 with chemically-active functional groups (FIG. 1C). The rough, bondable surface 12 is provided by a thin film of partially-cured peel ply resin that remains on the composite substrate 11 following peel ply removal.

Co-curing of the peel ply 10 and composite substrate 11 may be carried out at a temperature ranging from room temperature to 375° F. (191° C.) for 1 h-12 h at pressures ranging from 0 psi-80 psi (0 MPa-0.55 MPa). Moreover, co-curing may be achieved in an autoclave or by an out-of-autoclave process in which no external pressure is applied.

The cured composite substrate 11 with the bondable surface 12 may be joined to another composite substrate 13 with a curable, resin-based adhesive film 14 sandwiched in between the substrates and in contact with the bondable surface 12 as shown in FIG. 1D. The resin-based adhesive film 14 is in an uncured or partially cured state and possesses chemical functional groups that are capable of reacting with the chemically-active functional groups on the bondable surface 12. During a subsequent heat treatment to affect bonding, these functional groups react with each other to form chemical or covalent bonds.

Figure 1E:
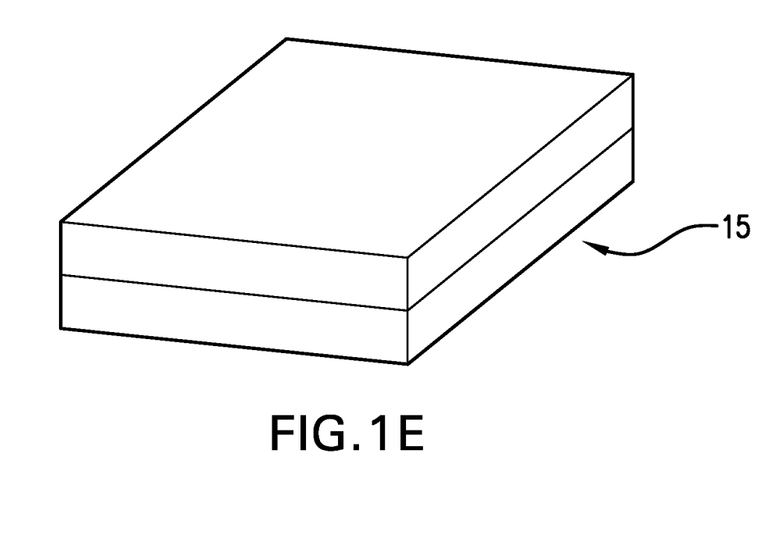

The composite substrate 13 may be a cured composite substrate that has been subjected to the same peel ply surface preparation as described for composite substrate 11 so as to form a counterpart bondable surface with chemically-active functional groups. The joined composite substrates 11 and 13 are then subjected heat treatment at elevated temperature(s) to cure the adhesive, resulting in a covalently bonded structure 15 (FIG. 1E)

this is referred to as secondary bonding. The adhesive film 14 may be applied to either or both of the bondable surface 12 of composite substrate 11 and the bondable surface of composite substrate 13.

Alternatively, the bondable surface of the composite substrate 13 may be prepared by other known surface treatments such as sand blasting, grit blasting, dry peel ply surface preparation, etc. "Dry peel ply" is a dry, woven fabric (without resin), usually made out of nylon, glass, or polyester, which is applied to the bonding surface of the composite substrate followed by curing. After curing, the dry peel ply is removed to reveal a textured bonding surface.

In another embodiment, the composite substrate 13 is in an uncured state when it is joined to the cured composite substrate 11. In such case, the uncured composite substrate 13 and the curable adhesive film 14 are cured simultaneously in a subsequent heating step—this is referred to as co-bonding.

During co-bonding or secondary bonding of the composite substrates according the methods disclosed herein, chemical or covalent bonds are formed between the reactive moieties present in the resin-based adhesive and the chemically-reactive functional groups on the bondable surface of the composite substrate derived from the resin-rich peel ply.

As a result, the covalently bonded structure has essentially no adhesive-composite interface. The presence of the chemically-active functional groups on the bondable surface described herein optimizes the subsequent bonding process by increasing the bond strength between the bonded substrates and improving bonding reliability. Furthermore, the covalently bonded structure is more resistant to contamination than bonded structures prepared by conventional co-bonding or secondary bonding processes.

The terms "cure" and "curing" as used herein encompass polymerizing and/or cross-linking of a polymeric material brought about by mixing of based components, heating at elevated temperatures, exposure to ultraviolet light and radiation. "Fully cured" as used herein refers to 100% degree of cure. "Partially cured" as used herein refers to less than 100% degree of cure.

The peel ply resin may contain one or more curing agents (or curatives), or may be void of any curing agent. In embodiments in which the peel ply resin contains a curing agent, the degree of cure of the partially cured peel ply after co-curing with the composite substrate may be within the range of 10%-75% of full cure, e.g. 25%-75% or 25%-50%. In embodiments in which the peel ply resin does not contain any curing agent, the peel ply is mostly uncured after co-curing with the composite substrate except at the composite-peel ply interface.

The degree of cure of a thermoset resin system can be determined by Differential Scanning calorimetry (DSC). A thermoset resin system undergoes an irreversible chemical reaction during curing. As the components in the resin system cure, heat is evolved by the resin, which is monitored by the DSC instrument. The heat of cure may be used to determine the percent cure of the resin material. As an example, the following simple calculation can provide this information:

$$\% \text{ Cure} = [\Delta H_{uncured} - \Delta H_{cured}]/[\Delta H_{uncured}] \times 100\%$$

Peel Ply

The resin-rich peel ply of the present disclosure is composed of a fabric impregnated with a curable matrix resin, and has a resin content of at least 20% by weight based on the total weight of the peel ply, depending on the specific type of fabric being impregnated. In certain embodiments, the resin content is within the range of 20%-80% by weight, preferably 20%-50%. In one embodiment, the resin-rich peel ply of the present disclosure contains, based on the total weight of the peel ply: 20 wt %-80 wt % of thermosetting matrix resin, 2 wt %-20 wt % curing agent(s), and 5 wt %-40 wt % of additional modifiers or filler additives.

Figure 2A:
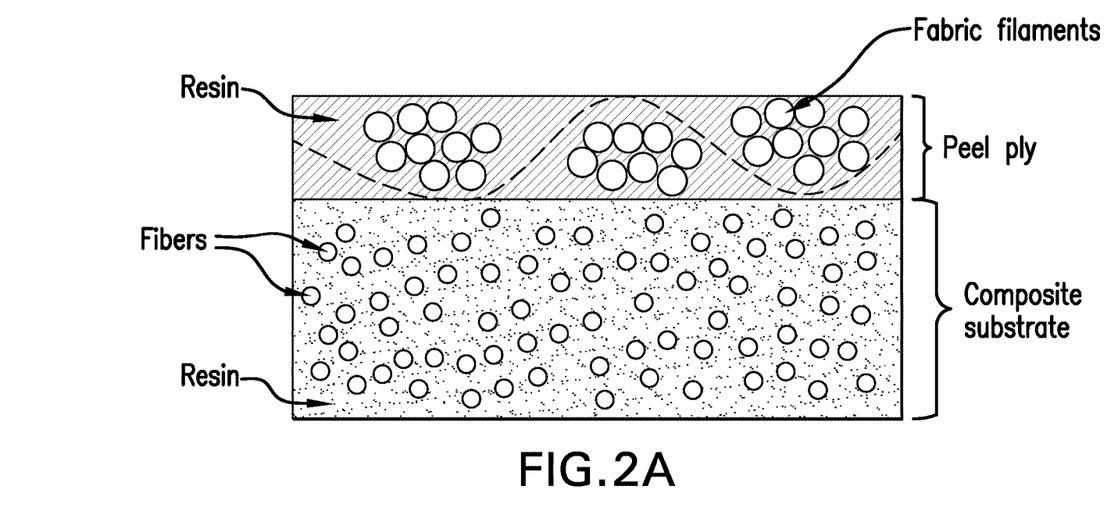
FIG. 2A schematically illustrates a resin-rich peel ply laminated onto a fiber-reinforced composite substrate.
Figure 2B:
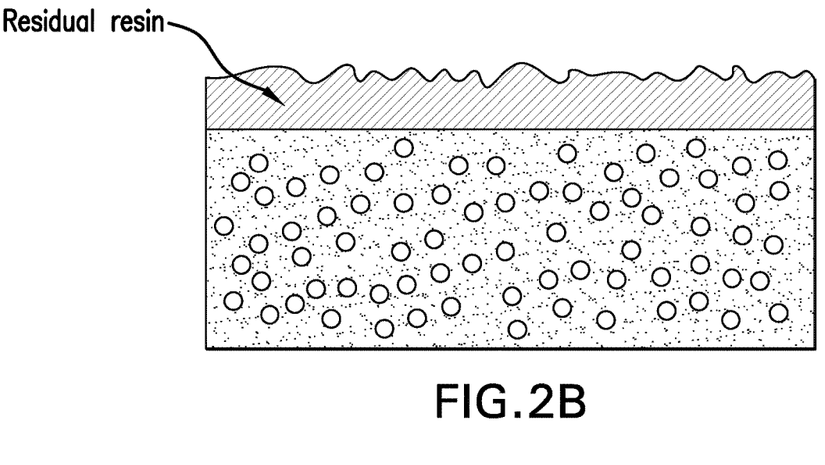
FIG. 2B schematically illustrates the composite substrate shown FIG. 2A after co-curing and the removal of the peel ply.

FIG. 2A schematically illustrates a resin-rich peel ply laminated onto a fiber-reinforced composite substrate. FIG. 2B schematically illustrates the composite substrate with a residual layer of peel ply resin remaining after co-curing and the removal of the peel ply. The fracture line during peeling is at the fiber-resin interface, but not within the fabric. The peel ply resin composition and the fabric construction are selected such that no broken fibers are left on the composite substrate's surface after the peel ply has been removed. Preferably, the peel ply resin remaining on the composite substrate's surface after curing has a lower glass transition temperature ($T_g$) than that of the composite resin matrix due to incomplete cure. The lower resin $T_g$ also allows for the surface peel ply resin to undergo viscous flow during a subsequent bonding step, thereby creating a condition in which the peel ply resin can intermingle with the adhesive resin.

In one embodiment, the matrix resin of the peel ply is formed from a curable resin composition which includes: one or more thermoset resins; at least one curing agent; and optionally, additives, modifiers, and fillers. According to another embodiment, the resin composition of the peel ply contains one or more thermoset resins, but does not include any curing agent.

Suitable thermoset resins include, but are not limited to, epoxies, phenolics, phenols, cyanate esters, bismaleimides, benzoxazines, polybenzoxazines, polybenzoxazones, combinations thereof and precursors thereof.

Particularly suitable are multifunctional epoxy resins (or polyepoxides) having a plurality of epoxide functional groups per molecule. The polyepoxides may be saturated, unsaturated, cyclic, or acyclic, aliphatic, aromatic, or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), fluorine 4,4'-dihydroxy benzophenone, bisphenol Z (4,4'-cyclohexylidenebisphenol) and 1,5-hyroxynaphthalene. Other suitable polyphenols as the basis for the polyglycidyl ethers are the known condensation products of phenol and formaldehyde or acetaldehyde of the novolac resin-type.

Examples of suitable epoxy resins include diglycidyl ethers of bisphenol A or bisphenol F, e.g. EPON™ 828 (liquid epoxy resin), D.E.R. 331, D.E.R. 661 (solid epoxy resins) available from Dow Chemical Co.; triglycidyl ethers of aminophenol, e.g. ARALDITE® MY 0510, MY 0500, MY 0600, MY 0610 from Huntsman Corp. Additional examples include phenol-based novolac epoxy resins, commercially available as DEN 428, DEN 431, DEN 438, DEN 439, and DEN 485 from Dow Chemical Co; cresol-based novolac epoxy resins commercially available as ECN 1235, ECN 1273, and ECN 1299 from Ciba-Geigy Corp.; hydrocarbon novolac epoxy resins commercially available as TACTIX® 71756, TACTIX®556, and TACTIX®756 from Huntsman Corp.

The peel ply resin composition is preferably a one-part system that is to be cured at an elevated temperature, and thus, it contains one or more curing agents. Such curing agents are capable of accomplishing cross-linking or curing of selective components of the peel ply resin composition when heated to a temperature above room temperature. For the purpose discussed herein, the amount of curing agents is selected so that there is preferably about 0.1 to about 1 equivalent of curing agent per one equivalent of epoxy molecule, more preferably between 0.1-0.5. The exact ratio of curing agent to epoxy is selected such that the optimum number of chemically-active surface functional groups is retained following co-curing with the composite substrate. Suitable curing agents for the peel ply resin may include, but are not limited to, aliphatic and aromatic amines, boron trifluoride complexes, guanidines, dicyandiamide, bisureas (e.g. 2,4-Toluene bis-(dimethyl urea), 4,4'-Methylene bis-(phenyl dimethylurea)), and diaminodiphenylsulfone, (e.g. 4,4'-diaminodiphenylsulfone or 4,4'-DDS). One or more curing agents may be used and the total amount of curing agent(s) may be within the range of 2%-20% by weight based on the total weight of the resin composition.

Inorganic fillers in particulate form (e.g. powder) may also be added to the peel ply resin composition as a rheology modifying component to control the flow of the resinous composition and to prevent agglomeration therein. Suitable inorganic fillers include, but are not limited to, fumed silica, talc, mica, calcium carbonate, alumina, ground or precipitated chalks, quartz powder, zinc oxide, calcium oxide, and titanium dioxide. If present, the amount of fillers in the peel ply resin compositions may be from 0.5% to 40% by weight, preferably 1-10% by weight, more preferably 1-5% by weight, based on the total weight of the resin composition.

The resin-rich peel ply may be formed by coating the resin composition described above onto the woven fabric so as to completely impregnate the yarns in the fabric using conventional solvent or hot-melt coating processes. The wet peel ply is then allowed to dry, if needed, to reduce the volatile content, preferably, to less than 2% by weight. Drying may be done by air drying at room temperature overnight followed by oven drying at 140° F.-170° F., or by oven drying at elevated temperature as necessary to reduce the drying time. Subsequently, the dried resin-rich peel ply may be protected by applying removable release papers or synthetic films (e.g. polyester films) on opposite sides. Such release papers or synthetic films are to be removed prior to using the peel ply for surface bonding.

In one embodiment, the ratio of thermoset resin(s) and curing agent(s) in the composition of the peel ply resin is adjusted so that the composition contains a deficiency in the amount of curing agent(s) that is necessary for reacting with 100% of the thermoset resin(s), and consequently, due to this deficiency, there will be unreacted or non-crosslinked functional groups from thermoset resin material at the end of a pre-determined curing cycle. For example, if an X amount of a curing agent is needed to achieve 100% degree of cure in a predetermined curing cycle, less than X amount, e.g. up to 80% X, preferably 25%-50% X, may be used in the peel ply resin composition to achieve partial curing. The thermoset resin material contains unreacted/noncrosslinked functional groups, which is the source of chemically-active functional groups for the bondable surface discussed above.

Composite Substrates

Composite substrates in this context refer to fiber-reinforced resin composites, including prepregs or prepreg layups (such as those used for making aerospace composite structures). The term "prepreg" as used herein refers to a layer of fibrous material (e.g. unidirectional tows or tape, nonwoven mat, or fabric ply) that has been impregnated with a curable matrix resin. The matrix resin in the composite substrates may be in an uncured or partially cured state. The fiber reinforcement material may be in the form of a woven or nonwoven fabric ply, or unidirectional tape. "Unidirectional tape" refers to a layer of reinforcement fibers, which are aligned in the same direction. The term "prepreg layup" as used herein refers to a plurality of prepreg plies that have been laid up in a stacking arrangement.

The layup of prepreg plies may be done manually or by an automated process such as Automated Tape Laying (ATL). The prepreg plies within the layup may be positioned in a selected orientation with respect to one another. For example, prepreg layups may comprise prepreg plies having unidirectional fiber architectures, with the fibers oriented at a selected angle θ, e.g. 0°, 45°, or 90°, with respect to the largest dimension of the layup, such as the length. It should be further understood that, in certain embodiments, the prepregs may have any combination of fiber architectures, such as unidirectionally aligned fibers, multi-directional fibers, and woven fabrics.

Figure 3:
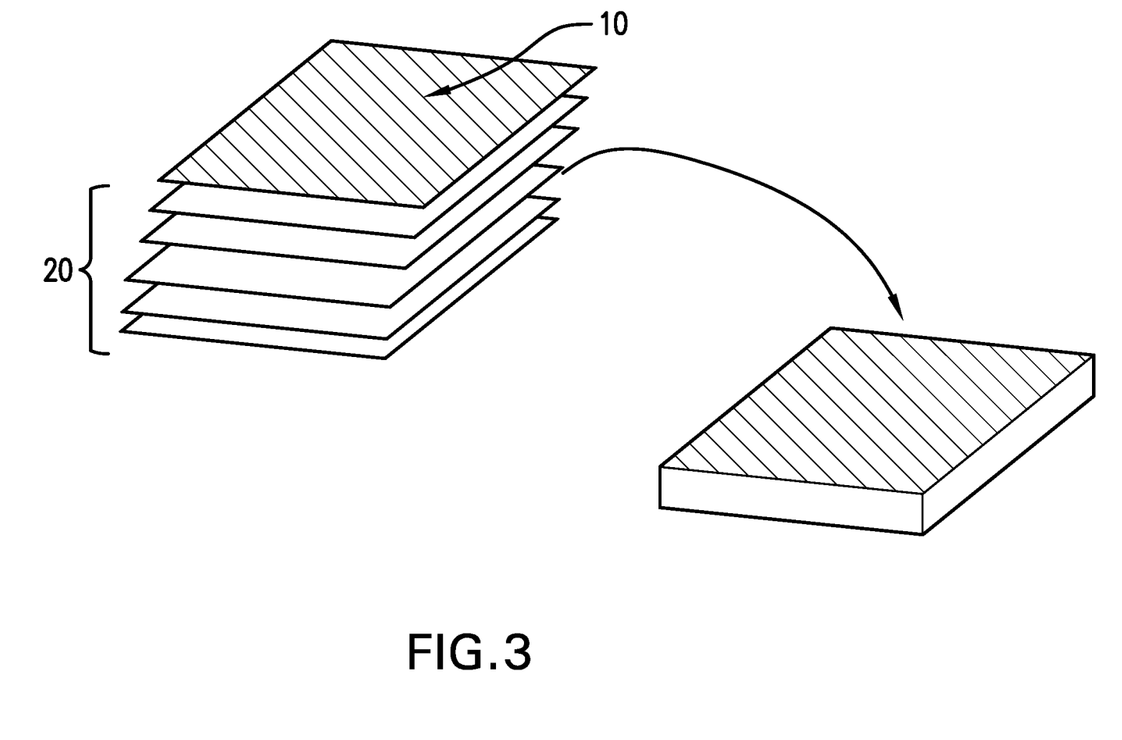
FIG. 3 shows a plurality of uncured prepreg plies being laid up together with a resin-rich peel ply, followed by co-curing, according to an embodiment of the present disclosure.

According to one embodiment (illustrated in FIG. 3), a plurality of uncured prepreg plies 20 may be laid up together with the curable, resin-rich peel ply 11 described above as the outermost layer, followed by co-curing and peel ply removal to provide a bondable surface with chemically-active functional groups as described above with reference to FIGS. 1A-1C. As examples, the number of prepreg plies may be 2-100 plies, or 10-50 plies.

Prepregs may be manufactured by infusing or impregnating continuous fibers or woven fabric with a matrix resin system, creating a pliable and tacky sheet of material. This is often referred to as a prepregging process. The precise specification of the fibers, their orientation and the formulation of the resin matrix can be specified to achieve the optimum performance for the intended use of the prepregs. The volume of fibers per square meter can also be specified according to requirements.

In prepregging, the reinforcing fibers are impregnated with the matrix resin in a controlled fashion and then frozen in order to inhibit polymerization of the resin. The frozen prepregs are then shipped and stored in the frozen condition until needed. When manufacturing composite parts from prepregs, the prepregs are thawed to room temperature, cut to size, and assembled on a molding tool. Once in place, the prepregs are consolidated and cured under pressure to achieve the required fiber volume fraction with a minimum of voids.

The term "impregnate" refers to the introduction of a curable matrix resin material to reinforcement fibers so as to partially or fully encapsulate the fibers with the resin. The matrix resin for making prepregs may take the form of resin films or liquids. Moreover, the matrix resin is in a curable/uncured state prior to bonding. Impregnation may be facilitated by the application heat and/or pressure.

As an example, the impregnating method may include:
(1) Continuously moving fibers through a (heated) bath of molten impregnating matrix resin composition to fully or substantially fully wet out the fibers; or
(2) Pressing top and bottom resin films against continuous, unidirectional fibers arranged in parallel or a fabric ply.

The reinforcement fibers in the composite substrates (e.g. prepregs) may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. Woven fiber structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin.

The fiber materials include, but are not limited to, glass (including Electrical or E-glass), carbon, graphite, aramid, polyamide, high-modulus polyethylene (PE), polyester, poly-p-phenylene-benzoxazole (PBO), boron, quartz, basalt, ceramic, and combinations thereof.

For the fabrication of high-strength composite materials, such as those for aerospace and automative applications, it is preferred that the reinforcing fibers have a tensile strength of greater than 3500 MPa.

Generally, the matrix resin of the composite substrates is similar to that of the peel ply resin. It contains one or more thermoset resins as the major component in combination with minor amounts of additives such as curing agents, catalysts, co-monomers, rheology control agents, tackifiers, rheology modifiers, inorganic or organic fillers, thermoplastic or elastomeric toughening agents, stabilizers, inhibitors, pigments/dyes, flame retardants, reactive diluents, and other additives well known to those skilled in the art for modifying the properties of the resin matrix before or after curing.

The thermoset resins that are suitable for the matrix resin of the composite substrates are those described above in reference to the peel ply's matrix resin.

Suitable epoxy resins for the matrix resin of the composite substrates include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol- and phenol-based novolac epoxy resins.

The addition of curing agent(s) and/or catalyst(s) may increase the cure rate and/or reduce the cure temperatures of the matrix resin. The curing agent for thermoset resins is suitably selected from known curing agents, for example, guanidines (including substituted guanidines), ureas (including substituted ureas), melamine resins, guanamine, amines (including primary and secondary amines, aliphatic and aromatic amines), amides, anhydrides (including polycarboxylic anhydrides), and mixtures thereof.

The toughening agents may include thermoplastic and elastomeric polymers, and polymeric particles such as core-shell rubber particles, polyimide particles, polyamide particles, etc.

Inorganic fillers may include fumed silica quartz powder, alumina, platy fillers such as mica, talc or clay (e.g., kaolin).

Adhesive

The adhesive for bonding composite substrates is a curable composition suitable for co-curing with uncured or curable composite substrates. The curable adhesive composition may comprise one or more thermoset resins, curing agent(s) and/or catalyst(s), and optionally, toughening agents, filler materials, flow control agents, dyes, etc. The thermoset resins include, but are not limited to, epoxy, unsaturated polyester resin, bismaleimide, polyimide, cyanate ester, phenolic, etc.

The epoxy resins that may be used for the curable adhesive composition include multifunctional epoxy resins having a plurality of epoxy groups per molecule, such as those disclosed for the matrix resin of the peel ply and composite substrate.

The curing agents may include, for example, guanidines (including substituted guanidines), ureas (including substituted ureas), melamine resins, guanamine, amines (including primary and secondary amines, aliphatic and aromatic amines), amides, anhydrides, and mixtures thereof. Particularly suitable are latent amine-based curing agents, which can be activated at a temperature greater than 160° F. (71° C.), preferably greater than 200° F., e.g. 350° F. Examples of suitable latent amine-based curing agents include dicyandiamide (DICY), guanamine, guanidine, aminoguanidine, and derivatives thereof. A particularly suitable latent amine-based curing agent is dicyandiamide (DICY).

A curing accelerator may be used in conjunction with the latent amine-based curing agent to promote the curing reaction between the epoxy resins and the amine-based curing agent. Suitable curing accelerators may include alkyl and aryl substituted ureas (including aromatic or alicyclic dimethyl urea); bisureas based on toluenediamine or methylene dianiline. An example of bisurea is 2,4-toluene bis (dimethyl urea). As an example, dicyandiamide may be used in combination with a substituted bisurea as a curing accelerator.

Toughening agents may include thermoplastic or elastomeric polymers, and polymeric particles such as core-shell rubber (CSR) particles. Suitable thermoplastic polymers include polyarylsulphones with or without reactive functional groups. An example of polyarylsulphone with functional groups include, e.g. polyethersulfone-polyetherethersulfone (PES-PEES) copolymer with terminal amine functional groups. Suitable elastomeric polymers include carboxyl-terminated butadiene nitrile polymer (CTBN) and amine-terminated butadiene acrylonitrile (ATBN) elastomer. Examples of CSR particles include those commercially available under the trademark Kane Ace®, such as MX 120, MX 125, and MX 156 (all containing 25 wt. % CSR particles dispersed in liquid Bisphenol A epoxy).

Inorganic fillers may be in particulate form, e.g. powder, flakes, and may include fumed silica quartz powder, alumina, mica, talc and clay (e.g., kaolin).

EXAMPLES

The following Examples are provided to illustrate certain aspects of the present disclosure. In the following examples, amounts shown in the Tables are in parts by weight ("pbw") unless indicated otherwise.

Example 1

Four curable peel ply resin mixtures were prepared based on the formulations shown in Table 1. The resin mixtures labeled as Resin-17, Resin-11, Resin-8 were prepared using the same formulation as the resin mixture labeled as Control but the amount of 4,4'-diaminodiphenylsulfone (4,4'-DDS) curing agent was changed from 20.9 parts to 17 pbw, 11.3 pbw, 8.3 pbw, respectively.

TABLE 1

| Ingredients | Control | Resin-17 | Resin-11 | Resin-8 |
|---|---|---|---|---|
| Phenol novolac epoxy resin | 50 | 50 | 50 | 50 |
| Diglycidyl ether of Bisphenol A | 25 | 25 | 25 | 25 |
| Triglycidyl ether of aminophenol | 20 | 20 | 20 | 20 |
| Dicyclopentadiene-based novolac epoxy resin | 10 | 10 | 10 | 10 |
| 4,4'-diaminodiphenylsulfone (4,4'-DDS) | 20.9 | 17.0 | 11.3 | 8.3 |
| Fumed silica | 2 | 2 | 2 | 2 |

The resin mixture was mixed using a hot-melt process followed by coating each of the above resin mixtures onto a polyester-based fabric material from Porcher Industries (Porcher 8115). The resulting resin-impregnated fabric layers were then used as peel ply materials.

Each of the prepared peel ply materials was manually laid up with 10 plies of CYCOM 977-2 (a prepreg material containing carbon fibers impregnated with epoxy-based matrix resin, available from Cytec Engineered Materials) with the peel ply forming the outer skin. The uncured laminate was then cured by heating at 350° F. for 3 hours at 80 psi. After curing, the peel ply (including the fabric) was removed by hand to yield a cured composite article with a bondable surface. The Control peel ply was fully cured and produced substantially no functional groups on the bonding surface, but the other peel plies provided partially cured surfaces containing unreacted epoxy functional groups. The cured composite article with the bondable surface was then bonded (via secondary bonding) to another identical composite article using an epoxy-based adhesive FM 309-1

(available from Cytec Engineered Materials). The epoxy-based adhesive was uncured and contained an amine-type curing agent which provided amine functional groups. Secondary bonding was carried out by heating at 3° F. per minute to 350° F. and holding for 90 min at 40 psi.

The peel ply formulations disclosed in TABLE 1 were designed so that the content of 4,4'-DDS curing agent was varied to selectively control the amount of unreacted, epoxy functional groups remaining after co-curing with the prepreg plies. By lowering the amount of 4,4'-DDS in the peel ply formulation, it was apparent that less epoxy groups was consumed during co-curing with the prepreg plies, thereby allowing for the retention of epoxy functional groups that can subsequently react with the functional groups of the adhesive.

Mechanical Properties of Bonded Structures and Characterization

The mechanical performance of the bonded structures produced above was determined by a $G_{1c}$ fracture toughness test done in accordance to ASTM D5528. The $G_{1c}$ results are shown in TABLE 2.

TABLE 2

| Fracture Toughness | Control | Resin-17 | Resin-11 | Resin-8 |
|---|---|---|---|---|
| $G_{1c}$ (Joules/m$^2$) | 976 | 1140 | 1046 | 1088 |

TABLE 2 shows that the bonded structures formed with the aid of partially-cured peel ply materials (Resin-17, Resin-11, and Resin-8) resulted in stronger bond strength as compared to that formed from using fully-cured, peel ply (Control). More importantly, the failure mode became more cohesive, which is the desired type of failure, in the systems containing partially cured peel ply.

Example 2

The retention of active functional groups on partially cured peel ply surface was demonstrated through an investigation of the peel ply materials using Fourier Transform Infrared (FT-IR) spectroscopy. FT-IR spectroscopy is a useful spectroscopic tool for characterizing functional groups and allows for identification of structural components of materials. A peel ply was formed from a resin composition with a deficiency in curative (i.e. curing agent) and a control peel ply was formed from a resin composition with 1:1 ratio of Epoxy:Curative. The peel ply compositions are shown in Table 3.

TABLE 3

| Ingredients | Control Peel Ply | Curative-Deficient Peel Ply |
|---|---|---|
| Phenol novolac epoxy resin; functionality = 3.8 | 50.00 | 50.00 |
| Diglycidyl ether of Bisphenol A | 25.00 | 25.00 |
| Triglycidyl ether of aminophenol | 20.00 | 20.00 |
| Dicyclopentadiene-based novolac epoxy resin; functionality = 3.2 | 10.00 | 10.00 |
| 4,4'-DDS | 20.85 | 8.34 |
| Fumed silica | 2.00 | 2.00 |

Figure 4:
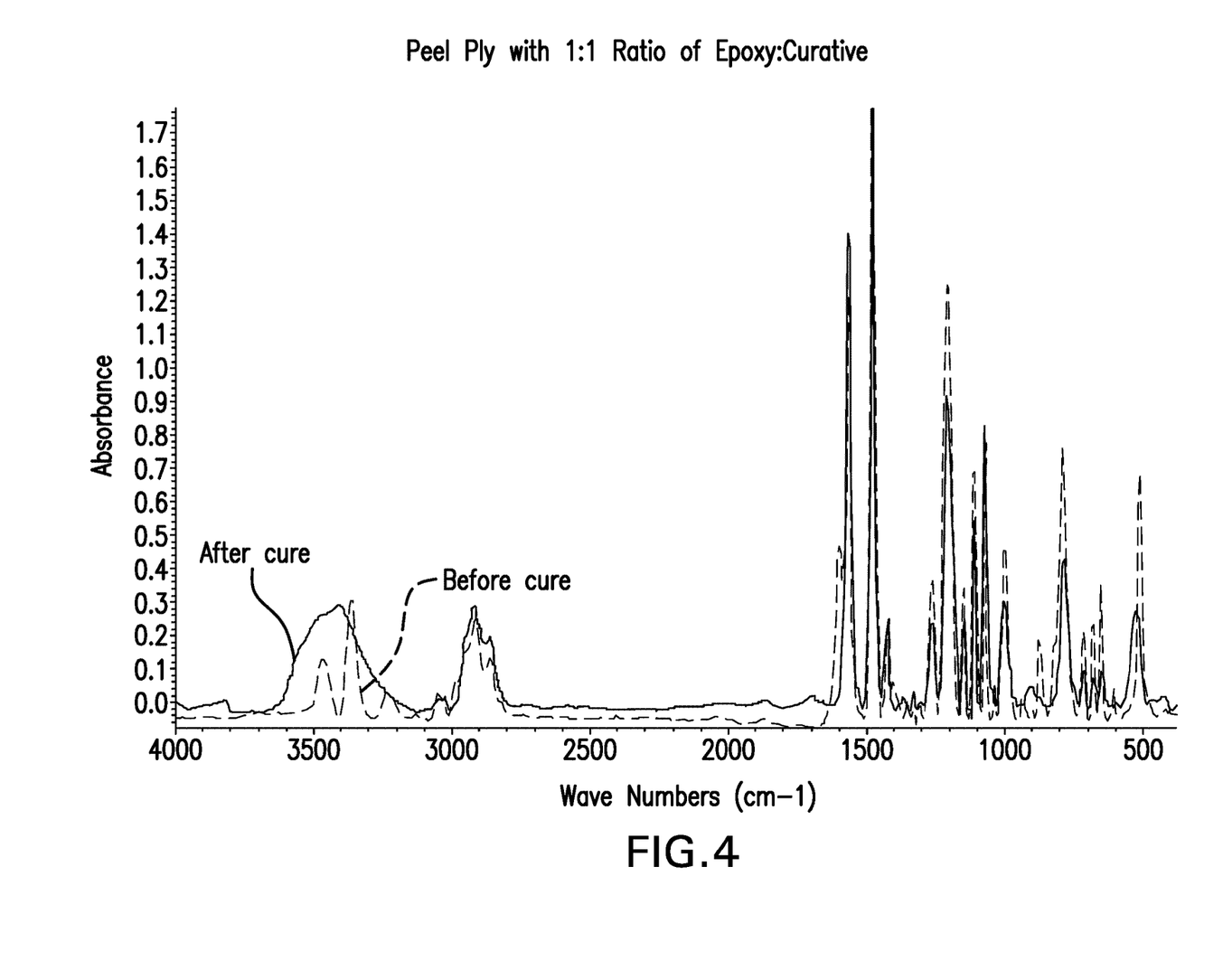
FIG. 4 shows FT-IR (Fourier Transform Infrared) spectrum of a peel ply containing 1:1 ratio of epoxy:curative.
Figure 5:
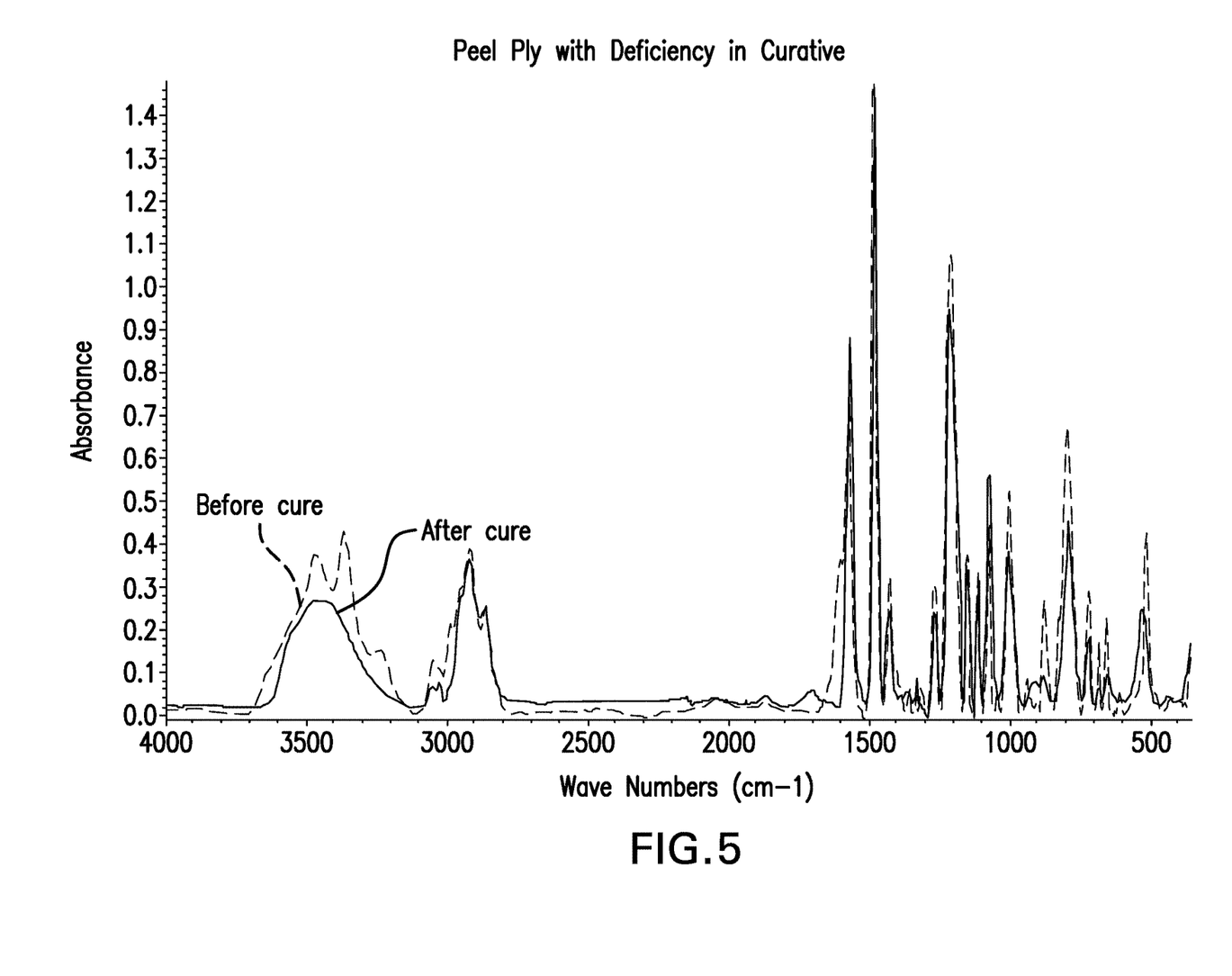
FIG. 5 shows FT-IR spectrum of a peel ply containing a deficiency in curative.

Each peel ply was laid up with prepreg plies and co-cured as described in Example 1. FIG. 4 shows the FT-IR spectra of the control peel ply material, which contained enough curative to fully cure the thermoset resin therein, and FIG. 5 shows the FT-IR spectra of the peel ply material in which there was a deficiency in the amount of curative such that not all of the thermoset resin was consumed during co-curing, resulting in a partially-cured peel ply. The peak at approximately 914 cm$^{-1}$ is a characteristic band that is attributed to a stretching vibration of the oxirane ring. The height of the absorbance, or peak height, is an indicator of the amount of epoxy groups present in a given material. As can be seen in FIG. 5, the partially cured peel ply has a higher amount of epoxy functional groups following co-curing.

The presence of surface active functional groups produced in such a way has the benefit of providing chemical bonds at the substrate-adhesive interface as compared to traditional secondary bonded structures. Consequently, the method of the present disclosure provides a way of secondarily bonding composite materials to produce a co-cured structure. The improvement of this bonding method is that it provides reliability and structural redundancy to bonded structures.

Example 3

Figure 6:
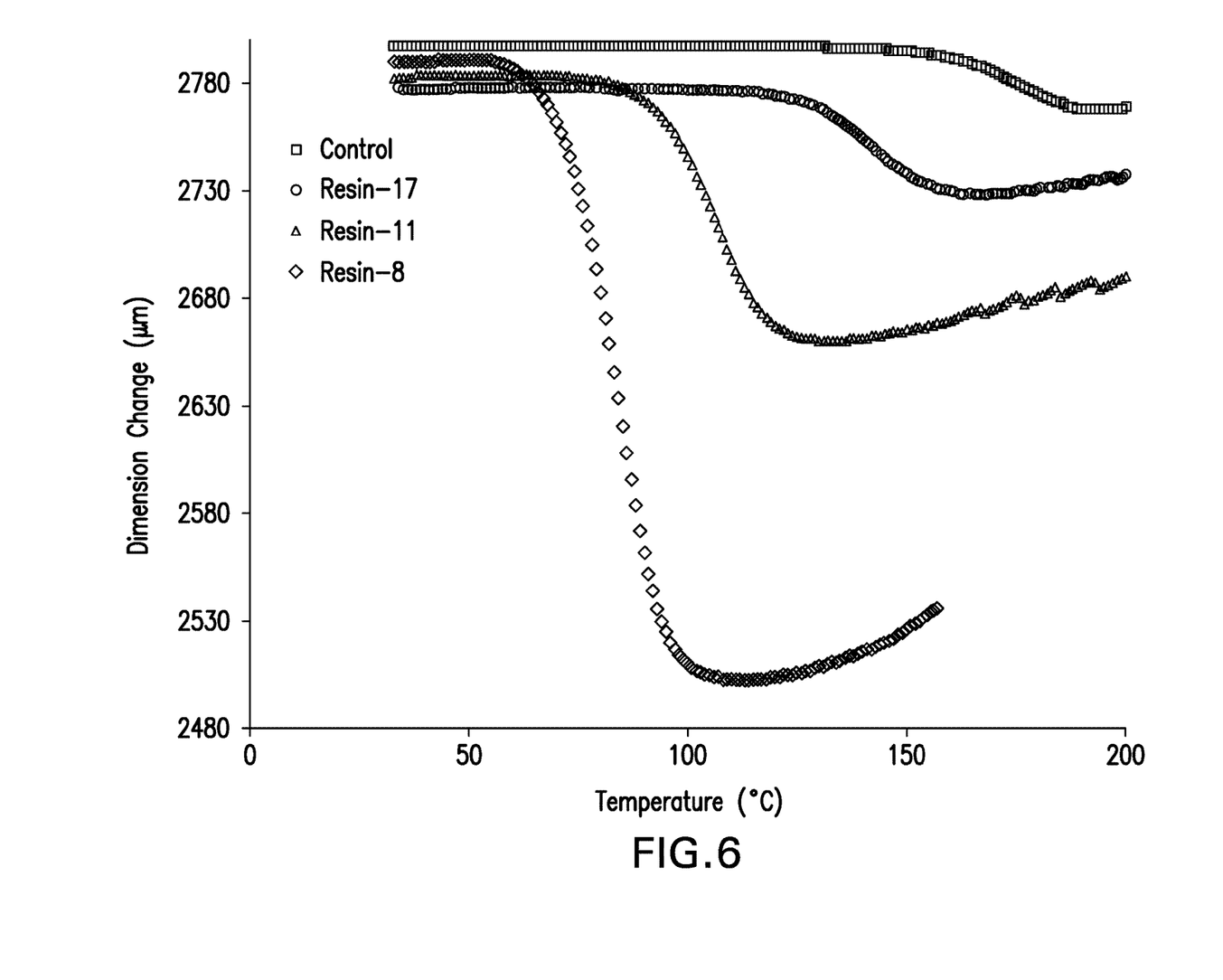
FIG. 6 is a graph showing the Thermomechanical Analysis (TMA) of different peel ply systems according to one example.

The peel ply formulations in Example 1 were studied through Thermomechanical Analysis (TMA) to analyze the glass transition temperature. FIG. 6 shows the results of the study and demonstrates that the $T_g$ of the peel ply resin surface can be controlled by modification of formulation ratios.

Example 4

Two curable peel ply resin mixtures labeled as Resin-12 and Resin-6 were prepared based on the formulations shown in Table 4. The resin mixtures were prepared using a hot-melt process followed by coating each of the above resin mixtures onto a polyester-based fabric material from Porcher Industries (Porcher 8115). The resulting resin-impregnated fabric layers were then used as peel ply materials.

TABLE 4

| Ingredients | Resin-12 | Resin-6 |
|---|---|---|
| Diglycidyl ether of Bisphenol A | 29.55 | 29.55 |
| Tetrafunctional Glycidyl Amine Epoxy Resin | 31 | 31 |
| 4,4'-diaminodiphenylsulfone (4,4'-DDS) | 12.6 | 6.3 |
| Polyethersulfone | 10 | 10 |

Each of the prepared peel ply materials was manually laid up with 10 plies of CYCOM 977-2, with the peel ply forming the outer skin. The uncured laminate was then cured by heating at 350° F. for 3 hours at 80 psi. For comparison, another prepreg layup was prepared in a similar fashion with the exception that the resin-rich peel ply prepared above was replaced with a dry polyester fabric peel ply (Porcher 8115). After curing, each peel ply was removed by hand to yield a cured composite article with a bondable surface. The cured composite article with the bondable surface was then bonded (via secondary bonding) to another identical composite article using an epoxy-based adhesive FM 309-1. The epoxy-based adhesive was uncured and contained an amine-type curing agent which provided amine functional groups. Secondary bonding was carried out by heating at 3° F. per minute to 350° F. and holding for 90 minutes at 40 psi.

A co-cured control structure was also prepared by laying up two 10-pli stacks of CYCOM 977-2 prepreg material, sandwiching FM 309-1 adhesive between the prepreg stacks, and co-curing by heating for 90 minutes at 350° F. at 80 psi.

Mechanical Properties of Bonded Structures and Characterization

The mechanical performance of the bonded structures produced in this Example was determined by a $G_{1c}$ fracture toughness test done in accordance to ASTM D5528. The $G_{1c}$ results are shown in TABLE 5.

TABLE 5

| Fracture Toughness | Dry Peel Ply | Co-Cure | Resin-12-based peel ply | Resin-6-based peel ply |
|---|---|---|---|---|
| $G_{1c}$ (Joules/m$^2$) | 1386 | 1113 | 1325 | 1373 |

Example 5

A 4-ply laminate of CYCOM 977-2 prepreg material was laid up with a peel ply based on Resin-6 of Example 4 above as the outer skin. The uncured laminate was then cured by heating at 350° F. for 3 hours at 80 psi, whereby the Resin-6 peel ply was partially cured at the end of cure cycle. After removal of the peel ply, the cured composite laminate with partially cured, residual peel ply film was then bonded to a similarly prepared, cured laminate (also containing partially cured, residual peel ply film) with the peel ply-treated surfaces facing each other and an epoxy-based adhesive FM 309-1 in between. The epoxy-based adhesive was uncured and contained an amine-type curing agent which provided amine functional groups. During bonding the bonded assembly was also adhered to 2"×2" aluminum fixture blocks. The entire assembly was vacuum bagged and cured in an autoclave by heating at 3° F. per minute to 350° F. and holding for 90 minutes at 40 psi. The cured laminate was then tested on an Instron test machine by pulling in face-tension to evaluate the fracture mechanics of failure.

Control laminates were similarly fabricated by following the above procedure for both a secondarily bonded panel prepared by using a dry peel ply to replace the Resin-6-based peel ply above and for a co-cured panel produced by curing the entire assembly in one step (but no peel ply was used).

Table 6 shows the results from flatwise tensile testing of the cured laminates and demonstrates the effectiveness of the peel ply based on Resin-6. The effect of the Resin-6 peel ply on interfacial properties was also evaluated by analyzing the failure mode to determine if the peel ply adversely affects bond-ability. From the analysis of fractured specimen, the weak point of the assembly was the prepreg laminate. The results clearly demonstrate that the use of the Resin-6 peel ply provides a robust bonding surface that enhances structural strength.

TABLE 6

|  | Control (Co-Cure) | Control (Dry Peel Ply) | Resin-6 Peel Ply |
|---|---|---|---|
| Flatwise Tensile Strength (psi) | 1877 | 2050 | 3090 |

What is claimed is:

1. A curable composite structure comprising:
   a removable, resin-rich peel ply on a surface of a composite substrate,
   wherein the composite substrate comprises reinforcing fibers impregnated with a curable, first matrix resin and the peel ply comprises a fabric impregnated with a curable, second matrix resin different from the first matrix resin, and
   wherein the second matrix resin contains an insufficient amount of curing agent for fully curing the second matrix resin under the same curing conditions that would result in fully curing of the first matrix resin.

2. The curable composite structure of claim 1, wherein the second matrix resin comprises at least one thermoset resin and at least one curing agent for crosslinking the thermoset resin, and the molar ratio of thermoset resin to curing agent is such that there is a deficiency in the amount of curing agent that is necessary for reacting with 100% of the thermoset resin when both of the first and second matrix resins are subjected to the same curing conditions that would result in fully curing the first matrix resin, and consequently, there is unreacted, non-crosslinked thermoset resin in the peel ply when the first matrix resin is fully cured.

3. The curable composite structure of claim 2, wherein the at least one thermoset resin in the second matrix resin is a multifunctional epoxy resin.

4. The curable composite structure of claim 1, wherein the composite substrate is a prepreg layup comprised of a plurality of prepreg plies arranged in a stacking arrangement, each prepreg ply comprising unidirectional reinforcing fibers impregnated with the curable, first matrix resin.

* * * * *